United States Patent [19]

[11] 3,856,832
[45] Dec. 24, 1974

[54] PROCESS FOR RECOVERING COBALT CATALYST IN AN ACTIVE FORM FROM A HYDROESTERIFICATION REACTION MIXTURE

[73] Assignee: Ethyl Corporation, Richmond, Va.
[22] Filed: May 24, 1973
[21] Appl. No.: 363,492

Related U.S. Application Data
[63] Continuation-in-part of Ser. No. 95,958, Dec. 7, 1970, abandoned.

[52] U.S. Cl....... 260/410.9 R, 260/270 R, 260/408, 260/410, 260/468 M, 260/485 R, 260/497 R, 252/414
[51] Int. Cl....................... C07c 67/00, C01g 51/02
[58] Field of Search......... 260/410.9 R, 497 R, 410, 260/468 M, 497 C, 486 AC, 270 R; 252/414

[56] References Cited
UNITED STATES PATENTS
2,967,873    1/1961    Koch et al. ..................... 260/410.9
3,060,228   10/1962    Pino................................... 260/486
3,644,443    2/1972    Shubkin............................. 260/413

FOREIGN PATENTS OR APPLICATIONS
700,224   12/1964   Canada

Primary Examiner—Lewis Gotts
Assistant Examiner—Diana G. Rivers
Attorney, Agent, or Firm—Donald L. Johnson; Robert A. Linn

[57]    ABSTRACT

A process for recovering substantially all of the cobalt catalyst in an active form from a hydroesterification reaction mixture. The hydroesterification reaction is the catalytic reaction of olefin, CO and alkanol to produce a carboxylic acid ester. Since the recovered cobalt catalyst is active, it can be directly recycled for use as a hydroesterification catalyst.

48 Claims, No Drawings

PROCESS FOR RECOVERING COBALT CATALYST IN AN ACTIVE FORM FROM A HYDROESTERIFICATION REACTION MIXTURE

CROSS REFERENCE TO RELATED APPLICATION

This application is a Continuation-in-Part of copending application Ser. No. 95,958, filed Dec. 7, 1970, now abandoned.

BACKGROUND OF THE INVENTION

This application discloses a process for recovering cobalt catalyst from a hydroesterification reaction mixture. Hydroesterification is a catalytic process for preparing esters from olefin, CO and alkanol. Cobalt carbonyl is a commonly used catalyst.

Hydroesterification catalyzed by cobalt catalysts is known (U.S. Pat. No. 2,542,767, issued Feb. 20, 1951, to DuPont); and the use of promoters in this reaction is also described in the art [A. Matsuda and H. Uchida, Chem. Soc. Jap. Bull. 38, 710–715 (1965); U.S. Pat. No. 3,507,891, issued Apr. 21, 1970, to Shell]. After carrying out the hydroesterification reaction it is very desirable that the cobalt catalyst be recovered from the reaction mixture.

A process has been discovered by which substantially all of the cobalt catalyst from a hydroesterification reaction mixture is recovered; and it is recovered in an active form suitable for direct use as a catalyst in a hydroesterification reaction. In addition, the catalyst is recovered before the ester product is taken off and consequently cobalt contamination of the product is significantly reduced.

SUMMARY OF THE INVENTION

A process for recovering substantially all of a cobalt catalyst in an active form from a hydroesterification mixture containing ester product, alkanol and cobalt catalyst obtained on reacting olefin, CO and alkanol, which comprises contacting said hydroesterification reaction mixture with a normally liquid hydrocarbon in an amount sufficient to dissolve the ester product and then separating the normally liquid hydrocarbon phase from the alkanol phase, said alkanol phase containing substantially all of the cobalt catalyst in an active form; an improved hydroesterification process which includes the aforesaid recovery of the cobalt catalyst and direct recycle of the recovered catalyst for hydroesterification.

DESCRIPTION OF THE PREFERRED EMBODIMENTS

An embodiment of this invention is a process for recovering cobalt containing catalyst in an active form from a reaction mixture containing ester product, alkanol and cobalt containing catalyst obtained from a cobalt catalyzed reaction of $C_3$–$C_{40}$ olefin, carbon monoxide and alkanol which comprises mixing said reaction mixture with a normally liquid hydrocarbon in an amount sufficient to extract the ester product and thereafter separating the alkanol phase from the normally liquid hydrocarbon phase, said alkanol phase containing substantially all of the cobalt containing catalyst in an active form suitable for use as a catalyst for said reaction of olefin, CO and alkanol. In a preferred embodiment the recovery is carried out on a hydroesterification mixture in which the alkanol has 1-5 carbon atoms and more preferably where the alkanol is methanol.

The hydroesterification reaction is illustrated by the following reaction equation:

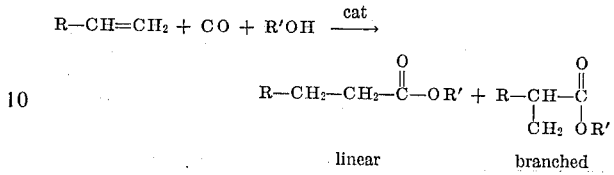

The ester products obtained are mixtures of branched and linear esters. The hydroesterification is ordinarily carried out at elevated temperatures (75°C.–200°C.) and under pressure ranging from about 500 to about 5,000 p.s.i. Olefins which are used in the hydroesterification process are unsaturated organic compounds having at least one non-aromatic carbon to carbon double bond, and having from 2 to about 40, preferably from 6 to about 24 carbon atoms. They include compounds having other functional groups such as carboxy, carbonyl, halide, aryl groups and the like, provided that these functional groups do not adversely affect the hydroesterification reaction of the present extraction process. Branched as well as straight chain, cyclic and alicyclic olefins are included. Useful olefins are ethyl acrylate, oleic acid, 2-chlorododecene-1, 6-phenylundecene-1, ricinoleic acid, 3-hydroxyheptadecene, and the like.

More preferred olefins are hydrocarbon monoolefins including the alpha as well as internal olefins. Examples of useful hydrocarbon monoolefins are ethylene, butene-1, pentene-2, cyclooctene, eicosene-1, hexadecene-2, octacosene-4, 4-butyldecene-1, tetracontene-1, 5,7,11-trimethyldodecene-1, and the like. Mixtures of alpha and internal olefins are also useful. In addition, commercial mixtures of olefins obtained for example from Ziegler catalyzed low molecular weight olefins such as ethylene or propylene and those obtained by dehydrogenation of suitable paraffins and the like are also useful. These commercial mixtures are generally mixtures of various homologous olefins such as $C_4$, $C_6$, $C_8$ olefins; $C_{12}$, $C_{13}$, $C_{14}$, $C_{15}$, $C_{16}$ olefins; $C_8$, $C_{10}$, $C_{12}$, $C_{14}$, $C_{16}$ olefins; $C_{30}$–$C_{36}$ olefins; $C_{22}$, $C_{24}$, $C_{26}$ olefins and the like.

The alkanol reactants in the hydroesterification process are normally liquid alkanols having up to 12 carbon atoms. They include primary, secondary, and tertiary alkanols. They are exemplified by 2-dodecanol, tert-butanol, 2-ethylhexanol, cyclohexanol, 2,2-dimethylpropanol and the like. Monohydroxy alkanols having from 1-5 carbon atoms are most preferred. Examples of such alkanols are ethanol n-pentanol, 2-methylpropanol and isopropanol, sec-butanol and the like. The primary monohydroxy $C_1$–$C_5$ alkanols are more preferred. Methanol is a most preferred alkanol.

A cobalt catalyst is used in the hydroesterification process. Any cobalt containing compound capable of forming cobalt carbonyl under the hydroesterification reaction conditions can be used. Thus, cobalt nitrate, cobalt salts of $C_2$–$C_{30}$ alkanoic acids, cobalt acetate, cobalt naphthenate, cobalt chloride, cobalt sulfate and the like can be used. Dicobalt octacarbonyl can also be used directly, if preferred.

The concentration of catalyst in the hydroesterification reaction is varied. Generally an amount of catalyst sufficient to provide from 0.005 to 0.10 moles of cobalt per mole of olefin, is used.

Although not required in the hydroesterification reaction, a pyridine promoter can be utilized. Suitable pyridine promoters include pyridine and substituted pyridines such as the halopyridines, alkylpyridines, quinolines, cyanopyridines, acylpyridines, nitropyridines, and the like. Preferred pyridines are those which have no substituent in the alpha position. They are exemplified by $C_1$–$C_6$ alkylpyridines ($\beta$-picoline, 4-ethyl-3,5-dimethylpyridine, 4,4'-trimethylenedipyridine, 3-hexylpyridine, 3,5-dimethylpyridine, 3,5-diethylpyridine, 4-cyclohexylpyridine); acylpyridines (3-butyrylpyridine, 4-propionylpyridine, 4-acetyl-3-methylpyridine), and the like. Other useful pyridine promoters are described in U.S. Pat. No. 3,507,891, issued Apr. 21, 1970. Pyridine is a most preferred promoter.

When used, the amount of pyridine promoter can be varied over a wide range. A practical upper limit is about 250 moles of pyridine promoter per mole of cobalt in the catalyst, although greater amounts can be used. A preferred range is 6–50 moles of pyridine promoter per mole of cobalt.

The pyridine promoter effects improvement in the reaction rate and/or the ratio of linear to branched ester product obtained in the hydroesterification reaction. An improved hydroesterification process featuring the use of a pyridine promoter is disclosed in copending application, U.S. Ser. No. 883,308, filed Dec. 8, 1969, now abandoned, and is incorporated hereby by reference.

The cobalt catalyst recovery process is carried out on the hydroesterification reaction mixture before the ester product is recovered therefrom. Besides ester product, the hydroesterification reaction mixture at this point usually contains some unreacted alkanol, some olefin, cobalt catalyst and any promoter, if a promoter was used. The reaction mixture is cooled to about room temperature or below and then it is treated with a quantity of a normally liquid hydrocarbon.

Hydrocarbons which are suitable for this treatment should be fairly good solvents for the ester products of the hydroesterification and fairly poor solvents for the alkanol reactant of the hydroesterification. Useful hydrocarbons include $C_5$–$C_{20}$ alkanes (e.g. 2-methylpentane, pentane, cyclohexane, eicosane, tetradecane, and the like), $C_6$–$C_{30}$ olefins (e.g. hexene, triacontene, heneicosene, and the like), and mixtures thereof. Alkanes having 5 to about 10 carbon atoms are preferred. Examples of preferred alkanes are heptane, isooctane, pentane, decane, nonane, mixtures of these alkanes, and the like.

The reaction mixture is treated with an amount of hydrocarbon sufficient to extract the ester product out of the reaction mixture. The optimum amount of hydrocarbon to be used will depend on the solubility characteristics of the hydrocarbon, the ester product and the alkanol. Up to about 10 volumes of hydrocarbon per volume of reaction mixture can be used. Ordinarily, from about one-quarter to about six volumes of hydrocarbon per volume of reaction mixture is conveniently used; and 0.5 to 4 volumes of hydrocarbon per volume of reaction mixture is preferred; about 1 to 4 volumes of hydrocarbon per volume of reaction mixture is more preferred.

The reaction mixture is treated with the hydrocarbon in such a way as to ensure intimate contact between the two liquids in order to effect extraction of the ester product. After this treatment with the hydrocarbon, a two-phase system is obtained. The upper phase contains principally the hydrocarbon solvent, the ester product and substantially all of the unreacted olefin, while the lower phase contains principally alkanol and substantially all of the cobalt catalyst. Both phases also contain some promoter if one was used. The ester containing hydrocarbon layer is then separated from 'the cobalt containing alkanol layer. The ester is recovered from the hydrocarbon solvent using conventional means; and the hydrocarbon solvent can be reused for additional cobalt catalyst extractions. The alkanol layer contains substantially all of the cobalt catalyst from the hydroesterification mixture; and the catalyst is in an active form which can be used directly to catalyst another hydroesterification reaction. By substantially all, I mean at least about 70 percent of the total cobalt containing catalyst charged in the hydroesterification reaction. Active catalyst recoveries of 80 percent or more, and 90 percent or more of the total cobalt catalyst charged are preferred. If desired, this alkanol solution of recovered catalyst can be reused in volume by distilling alkanol from the solution. However, the catalyst solution is more conveniently recycled directly into a hydroesterification reaction mixture where the alkanol becomes a reactant. Since the cobalt catalyst is sensitive to air, usual precautions are taken to prevent unnecessary exposure of the catalyst solution to air both during and subsequent to the recovery process.

In order to facilitate the catalyst recovery, it is preferred that the reaction mixture contain a certain amount of alkanol. The amount of alkanol should be sufficient to dissolve the active cobalt catalyst species and result in a two-phase system after treatment with the hydrocarbon which extracts the ester product. To ensure that a sufficient excess of alkanol is present in the reaction mixture, it is preferred that the hydroesterification process be carried out using a stoichiometric excess based on the olefin reactant of alkanol reactant. For example olefin:alkanol molar reactant ratios of 1:1.1 to 1:6 or higher can be used; with 1:1.5 to 1:3 olefin:alkanol ratios being preferred. If a stoichiometric amount of alkanol, i.e., a molar ratio of olefin:alkanol of 1:1, is used, a sufficient amount of unreacted alkanol can be ensured if the conversion of olefin is kept below 100 percent. By conversion is meant the percent of olefin which has reacted to form ester. In the event that insufficient unreacted alkanol remains after the hydroesterification reaction has taken place, then an amount of alkanol, sufficient to dissolve the cobalt catalyst and effect a two-phase system after treatment with hydrocarbon, is added to the reaction mixture prior to or simultaneously with the hydrocarbon; and although any alkanol can be used; it is preferred that the alkanol added be the same as the one used in the hydroesterification reaction.

The following examples will illustrate the cobalt catalyst recovery process and the active nature of the cobalt catalyst which is recovered thereby. The reactants and hydrocarbon solvent were ordinarily deaerated before use.

EXAMPLE 1

An autoclave was charged with 61.8 grams (0.368 moles) of dodecene-1, 100 milliliters (mls) (2.47 moles) of absolute methanol, 19.2 mls (0.225 moles) of pyridine and 3 grams of dicobalt octacarbonyl. The autoclave was then flushed twice with CO, sealed and pressured to 3,000 p.s.i.g. The mixture was then stirred and heated to 150°C., the pressure rising to 3,725 p.s.i.g. The reaction was continued with stirring at this temperature for 3 hours. Then the autoclave was cooled and vented.

The reaction mixture thus obtained was transferred to a second vessel which had been previously purged with nitrogen. The reaction mixture was kept under a nitrogen blanket. To this reaction mixture was added 600 mls of n-heptane. The reaction mixture and heptane was then stirred vigorously and the vessel was cooled with ice water. Stirring was then discontinued and two phases formed. The upper phase (heptane layer) was siphoned from the lower phase (alkanol layer). The lower phase was then extracted three more times with 20 mls of heptane. The three 20 mls heptane extracts were combined with the 600 mls extract and analyzed for cobalt, pyridine and product ester. Analysis showed the heptane extract to contain 2.35 percent of the total cobalt originally charged, 63 percent of the total pyridine charged; and a mixture of methyltridecanoic esters which amounted to 86.4 percent yield based on the total dodecene-1 charged. This mixture of esters was 75.0 percent linear.

The lower liquid phase, which remained after the heptane extraction, was deep red in color and about 50 mls in volume. This layer contained part of the unreacted methanol and, based on the heptane analysis, it also contained 97.56 percent of the cobalt originally charged and 37 percent of the pyridine originally charged. The entire 50 mls of red alkanol catalyst solution was then used directly with no further treatment to catalyze the hydroesterification reaction in Example 2.

EXAMPLE 2

An autoclave was charged with 61.8 grams (0.368 moles) of dodecene-1, 55 mls (1.36 moles) of absolute methanol, 15 mls (0.176 moles) of pyridine and the 50 mls of red catalyst solution recovered in Example 1. The autoclave was then flushed twice with CO, sealed and pressured to 3,000 p.s.i.g. The mixture was then heated and stirred to 150°C., the pressure rising to 3980 p.s.i.g. The reaction was continued with stirring at this temperature for 3 hours. The autoclave was then cooled and vented. The reaction mixture was then transferred to a second vessel and the cobalt catalyst was recovered as in Example 1. The red catalyst solution (about 45 mls) recovered was then utilized directly as the catalyst in Example 3.

Analysis of the total heptane extract (660 mls) showed that it contained 2.84 percent of the total cobalt originally charged in Examples 1; 65.6 percent of the total pyridine charged in Example 2; and a mixture of methyltridecanoate esters which amounted to an ester yield of 93.0 percent based on the dodecene-1 charged. The ester mixture was 79.4 percent linear.

EXAMPLE 3

An autoclave was charged with 61.8 grams (0.368 moles) of dodecene-1, 60 mls (1.48 moles) of absolute methanol, 15 mls (0.176 moles) of pyridine and the entire catalyst solution (45 mls) recovered from Example 2. The autoclave was then flushed twice with CO, sealed and pressured to 3,000 p.s.i.g. The mixture was then heated with stirring to 150°C., the pressure rising to 3,940 p.s.i.g. The reaction was continued at this temperature for 3 hours. The autoclave was then cooled and vented. The reaction mixture was then transferred to a second vessel as in Examples 1 and 2 and extracted as in Examples 1 and 2 with a total of 630 mls of n-heptane. About 50 mls of red catalyst solution was recovered.

Analysis of the total heptane extract showed that it contained 3.87 percent of the cobalt originally used in Example 1; 57.2 percent of the pyridine charged in Example 2; and a mixture of methyltridecanoate esters which amounted to a 87.1 percent yield based on the dodecene-1 charged. The mixture of esters was 79.4 percent linear.

As Examples 1–3 clearly show, better than 95 percent of the cobalt charged as catalyst in the hydroesterification reaction is recovered, utilizing the present hydrocarbon treatment recovery process. Furthermore, not only is substantially all of the cobalt recovered, but, as Examples 2 and 3 showed, it is in an active form directly suitable for use as a hydroesterification catalyst. Comparing the ester yields and percent linearity of Examples 1–3, it is also clear that the activity of the recovered catalyst is undiminished.

Although Examples 1–3 utilize pyridine promoter, analogous catalyst recovery results are expected to be obtained when the hydroesterification reaction is carried out in the absence of the promoter. However, without the promoter, the hydroesterification reaction rate and ester linearity are both reduced.

The volume:volume ratio of n-heptane:reaction mixture in each of Examples 1–3 was about 3:1. Use of pentane, cyclohexane, eicosane, dodecane, 2-ethylhexane, hexene-1, triacontene-1, pentadecene-1, or mixtures of hydrocarbons also effect analogous catalyst recovery when used in place of heptane in Examples 1–3. Hydrocarbon volume:reaction mixture volume ratios of 0.5:1, 1:1.5, 1:10, 1:6 and 1:3 are of comparable effectiveness in the above examples.

Following are additional examples illustrating the catalyst recovery process of the present invention.

EXAMPLE 4

An autoclave was flushed with $N_2$ and then charged with 215.4 ml (163.0 g) (0.97 mole) of dodecene-1, 79.2 mls (1.94 moles) absolute methanol, 50.7 ml (0.59 mole) of pyridine, and 7.92 g (0.232 mole) of dicobalt octacarbonyl. The autoclave was pressured twice to 200 p.s.i.g. with CO and vented; then it was sealed and pressured with CO to 2,500 p.s.i.g. and heated to 150°C. with stirring, the pressure rising to about 3,000 p.s.i.g. The reaction was continued at this temperature for 1 ½ hours. The autoclave was then cooled and vented.

The reaction mixture (350 ml) was transferred to a second vessel. 475 ml of deaerated nonane was added to the vessel and the contents were stirred vigorously. The stirring was discontinued and the mixture separated into two layers. The upper nonane layer and the lower red catalyst layer were each analyzed for cobalt. The results obtained were as follows:

|  | g of Cobalt | % Total Cobalt |
| --- | --- | --- |
| Nonane layer | 0.04 | 1.53 |
| Catalyst layer | 2.58 | 98.47 |

Similar cobalt recoveries may be obtained when 3-methylpyridine, 4-acetylpyridine, 4-ethylpyridine, 3,5-diethylpyridine, or 3-butylpyridine is used instead of pyridine in the above Example. Pentane, decane, cyclooctane, heptene, tetracosene, heptadecene, or mixtures thereof used instead of nonane may give analogous cobalt recoveries.

The nonane volume:reaction mixture volume in Example 4 was about 1.3:1. When n-nonane volume:reaction mixture volume ratios of 2:1 and 3:1 were used on the same type hydroesterification reaction mixture as in Example 4, cobalt recovery results were as follows:

| Nonane: Reaction Mix. (vol:vol) | Cobalt in Nonane layer | Cobalt in Red Catalyst layer |
| --- | --- | --- |
| 2:1 | 0.91 % | 99.09 % |
| 3:1 | 1.04 % | 98.96 % |

EXAMPLE 5

The procedure of Example 4 was repeated except that 475 ml of n-heptane were utilized instead of the n-nonane. Results of the n-heptane layer and lower red catalyst layer analysis for cobalt were as follows:

|  | g of Cobalt | % of Total Cobalt |
| --- | --- | --- |
| n-Heptane layer | 0.10 | 3.68 |
| Catalyst layer | 2.62 | 96.32 |

EXAMPLE 6

A clean, dry nitrogen-flushed stainless steel autoclave was charged with 13.6 pounds of 1-dodecene, 5.17 pounds of methanol and 3.9 pounds of pyridine. 300 grams of cobalt carbonyl were added to the autoclave with stirring. The autoclave was sealed, flushed with CO and then vented. After flushing, the autoclave was pressurized to 660 p.s.i.g. with CO. The autoclave was then heated to 155°C. and additional CO was added to raise the pressure to 1,000 p.s.i.g. The pressure was maintained between 1,010 and 1,050 p.s.i.g. by means of a pressure regulator while the reaction was continued for 10 hours at a temperature of 149°-153°C. At the end of this time, the heating was discontinued, and the autoclave was allowed to stand overnight.

The following day the autoclave was vented and flushed twice with nitrogen. The reaction mixture was then discharged from the autoclave into a separatory funnel system which contained n-heptane in an amount approximately equal in volume to the reaction mixture. (This n-heptane was commercial grade and was purged of air by bubbling nitrogen through it prior to charging the separatory funnel system.) The treatment in the separatory funnel system was carried out under nitrogen. Substantially no agitation of the n-heptane/reaction mixture in the separatory funnel system was effected because of the size and physical assembly used. The charge in the separatory funnel system and then allowed to separate into two phases. The lower phase containing the active cobalt containing catalyst, was drawn off. The total weight of the lower phase obtained was 1.5 lbs. Analysis showed this phase to contain 10.6 percent cobalt by weight. Thus, the amount of active cobalt catalyst recovered, based on the cobalt carbonyl charged, was 70.5 percent.

The yield of methyl tridecanoate esters obtained was about 96.5 percent, about 78.36 percent of which was methyl-n-tridecanoate.

EXAMPLE 7

An autoclave equipped with a constant pressure automatic gas feed and a sampling device was charged with 6.69 grams (0.0196 mole) of $Co_2(CO)_8$ cobalt carbonyl, 138 grams (0.820 mole) of 1-dodecene, 52.5 grams of methanol and 39.6 grams (0.500 mole) of pyridine. The autoclave was then sealed, flushed with CO and then pressured with CO to 600 p.s.i.g. and heated to 150°C. in 10 minutes. The reaction was continued with stirring for 5 hours at 149°-150°C. and maintaining the pressure, with CO, at 1,000-1,050 p.s.i.g. A total of eight samples were withdrawn during the course of this reaction to study the reaction rate.

At the end of the 5 hours, the vessel was allowed to cool and after venting, the reaction mixture was discharged and stored under nitrogen at room temperature for one week.

At this time, 125 milliliters of the reaction mixture were mixed with 125 milliliters of heptane in a separatory funnel in order to effect active cobalt catalyst recovery. Two layers formed. The lower cobalt catalyst containing layer was drawn off, analyzed and found to contain 757 milligrams of cobalt which calculates to be 81.8 percent of the total cobalt in the 125 milliliter portion of said reaction mixture.

A mixture of methyl tridecanoate esters was obtained as a product. The yield of product was about 91 percent by weight (based on the dodecene), 84 percent of which was the linear ester, i.e., methyl-n-tridecanoate.

EXAMPLE 8

This experiment was conducted using the same equipment and general procedure as in Example 7. The reagents charged were 5.98 grams (0.0175 mole) $Co_2(CO)_8$, 123.5 grams (9.734 moles) random dodecenes (containing about 90 percent internal dodecenes), 47.1 grams (1.470 moles) methanol, 35.5 grams (0.449 mole) of pyridine, and initial CO pressure of 990 p.s.i.g. The reaction was carried out for 6 hours at 150° ± 1°C. maintaining the pressure, with CO, at 990-1,020 p.s.i.g. As in the previous Example, samples (a total of 8) were withdrawn during the course of the reaction for rate study.

At the end of the 6 hours, the autoclave was allowed to cool, it was vented and the reaction mixture was discharged into a separatory funnel and diluted with an equal volume of heptane. Two layers formed. The lower active cobalt catalyst containing layer was drawn off and analyzed. This layer was found to contain 722 milligrams of cobalt which was calculated to be 82.5 percent of the total cobalt catalyst initially charged.

Yield of methyl tridecanoate ester product was about 88 percent by weight (based on the dodecene) with 80.5 percent of the prodcut being the linear ester.

EXAMPLE 9

An autoclave equipped with stirrer, was charged with 17.0 milliliters of catalyst solution (recovered from a previous hydroesterification reaction using the method of the present invention — this solution contained 23.1 millimoles cobalt, 3.4 mls methanol, and 12.0 mls pyridine), 111.0 mls (500 millimoles) 1-dodecene, 37 mls methanol and 11.6 mls pyridine. The autoclave was sealed, flushed with CO and then pressured to about 1,700 p.s.i.g. with CO. The autoclave was then heated to 150°C., the pressure rising to about 2,400 p.s.i.g. the reaction was carried out at this temperature for 1.5 hours with stirring. At the end of this time, the autoclave was allowed to cool and stand overnight. Then the autoclave was vented.

Analysis of the reaction mixture showed that the yield of methyl tridecanoate esters, based on the dodecene, was 70.5 percent by weight.

A 50 milliliter portion of the reaction mixture was then mixed with 50 milliliters of nonane in a separatory funnel. Two layers formed on standing. The lower cobalt catalyst containing layer was analyzed and found was mixed with 50 milliliters of heptane in a separatory funnel. Two layers formed on standing. The lower cobalt catalyst containing layer was analyzed and found to contain 96.6 percent of the cobalt in this 50 milliliter portion.

In addition to illustrating the present cobalt catalyst recovery system, the examples indicate that at reaction temperatures of about 150°C. the hydroesterification reaction pressure has an effect on the amount of cobalt recovery - but not on the activity of the recovered cobalt catalyst. At hydroesterification reaction pressures of about 1,000 p.s.i.g. (Examples 6–8), the cobalt recovery ranges from about 70.5 percent to about 82.5 percent. At reaction pressures in the 1700 p.s.i.g. and higher range (Examples 1–5, 9), cobalt recoveries are generally above about 90 percent. Thus, it is preferred that the hydroesterification be carried out at pressures of over about 1,700 p.s.i.g. and more preferably above about 2,000 p.s.i.g. to obtain maximum effectiveness of cobalt recovery. However, regardless of the hydroesterification reaction parameters, i.e., pressure, temperature, reactant ratios, etc., of the percent cobalt catalyst recovered, the cobalt catalyst recovered utilizing the present process is in its active form.

The following table lists other hydroesterification/-catalyst recovery systems illustrative of the present system.

Table I

| | Hydroesterification Reaction (1) | | | | Catalyst Recovery Treatment | |
|---|---|---|---|---|---|---|
| Olefin (moles) | Alkanol (moles) | Catalyst (moles) | Promoter (moles) | Olefin Conversion | Hydrocarbon Solvent | Hydrocarbon Reaction Solvent:Mixture (vol:vol) |
| propylene (1) | n-pentanol (1.5) | cobalt naphthenate (0.005) | none | 90% | pentane | 15:1 |
| mixed octenes(2) (1) | ethanol (1) | cobalt decanoate (0.1) | 3,5-dihexyl-pyridine (0.6) | 100% | 90% decane 10% ethanol (3) | 1.1 |
| tetracontene-1 (1) | 2-decanol (10) | cobalt acetate (0.05) | 3-butyryl-pyridine (2.5) | 100% | nonene | 10:1 |
| cyclohexene (1) | n-eicosanol (5) | cobalt carbonate (0.01) | 4-acetyl-pyridine (25) | 85% | dodecane | 7:1 |
| heptadecene-2 (1) | n-propanol (2.5) | cobalt sulfate (0.009) | 4-methyl-pyridine (5) | 60% | cyclohexane | 2.5:1 |
| tetracosene-1 (1) | tert-butanol (7) | cobalt chloride (0.07) | 3-ethyl-pyridine (2.8) | 79% | eicosane | 0.25:1 |

(1) Suitable reaction temperatures, CO pressures and reaction times are used to effect the indicated conversions.
(2) Mixture of α- and internal octenes.
(3) Alternatively, the ethanol may be added separately before or after the decane is added to the reaction mixture.

to contain 97 percent of the total cobalt in this 50 milliliter portion.

A second 26 milliliter portion of the reaction mixture was mixed with 39 milliliters of nonane in a separatory funnel. Two layers formed on standing. The lower cobalt catalyst containing layer was analyzed and found to contain 97.9 percent of the cobalt in this 26 milliliter portion.

A third 50 milliliter portion of the reaction mixture was mixed with 50 milliliters of 1-decene in a separatory funnel. Two layers formed on standing. The lower cobalt catalyst containing layer was analyzed and found to contain 96.1 percent of the cobalt in this 50 milliliter portion.

A fourth 50 milliliter portion of the reaction mixture

The cobalt catalyst recovery process can be carried out on any suitable reaction mixture obtained in a cobalt catalyzed:hydroesterification reaction.

As pointed out above and illustrated by the Examples, the cobalt catalyst is recovered in an active form. In other words, when the recovered catalyst is utilized to catalyze a hydroesterification reaction, the carbon monoxide gas up-take begins immediately after reaching the reaction temperature. This distinguishes the present catalyst recovery system for systems where cobalt is recovered from the reaction mixture in a form which itself is not an active catalyst; and the cobalt recovered in such a system requires conversion to the active catalyst form. By recovering the catalyst in an active form, as is presently accomplished, the step wherein the cobalt moiety is activated is eliminated. Thus, the present catalyst recovery system not only effects substantially complete catalyst recovery, but it also eliminates the added step and the time which it takes to activate recovered cobalt.

The examples above illustrate the catalyst recovery as a batch-type process. However, this recovery process is not necessarily limited to such a procedure. Any technique and means suitable for effecting the hydrocarbon treatment and subsequent separation of the two phases formed can be used. Thus, after the hydroesterification reaction mixture is obtained, the catalyst recovery can be carried out using means whereby the hydrocarbon treatment phase separation is continuous. Apparatus for such an operation is available.

If desired, the cobalt which remains dissolved in the hydrocarbon phase after separation can also be recovered, e.g. by oxidizing the cobalt in solution. This recovered cobalt then can be converted to a form which can be used as a hydroesterification catalyst.

The processes of the present invention have been described and exemplified above. Claims to the invention follow.

I claim:

1. A process for recovering cobalt containing catalyst in an active form from a reaction mixture containing ester product, alkanol and cobalt containing catalyst obtained from a cobalt catalyzed reaction of $C_3$–$C_{40}$ olefin, carbon monoxide and alkanol which comprises mixing said reaction mixture with a normally liquid hydrocarbon in an amount sufficient to extract the ester product whereby a normally liquid hydrocarbon phase and an alkanol phase are formed, and thereafter separating said alkanol phase from said normally liquid hydrocarbon phase, said alkanol phase containing substantially all of the cobalt containing catalyst in an active form suitable for use as a catalyst for said reaction of olefin, CO and alkanol.

2. The process of claim 1 wherein said amount of hydrocarbon is at least about one-quarter volume of hydrocarbon per volume of reaction mixture.

3. The process of claim 1 wherein said hydrocarbon is aliphatic.

4. The process of claim 3 wherein said hydrocarbon is independently selected from $C_5$–$C_{20}$ alkanes, $C_6$–$C_{30}$ olefins and mixtures thereof.

5. The process of claim 3 wherein said hydrocarbon is selected from $C_5$–$C_{10}$ alkanes and mixtures thereof.

6. The process of claim 1 wherein said alkanol has from 1 to about 12 carbon atoms.

7. The process of claim 6 wherein said alkanol is primary, monohydroxy, $C_1$–$C_5$ alkanol.

8. The process of claim 7 wherein said alkanol is methanol.

9. The process of claim 1 wherein said cobalt catalyzed reaction includes a pyridine promoter.

10. The process of claim 9 wherein said prometer is pyridine.

11. The process of claim 9 wherein said hydrocoarbon is aliphatic.

12. The process of claim 11 wherein said alkanol is primary, monohydroxy, $C_1$–$C_5$ alkanol.

13. The process of claim 12 wherein said promoter is pyridine and said alkanol is methanol.

14. The process of claim 1 wherein the molar ratio of olefin:alkanol is at least about 1:1.1.

15. The process of claim 14 wherein said olefin:alkanol molar ratio is 1:1.1 to 1:3.

16. The process of claim 14 wherein said alkanol is primary, monohydroxy, $C_1$–$C_5$ alkanol.

17. The process of claim 16 wherein said hydrocarbon is aliphatic.

18. The process of claim 17 wherein said hydrocarbon is selected from $C_5$–$C_{20}$ alkanes, $C_6$–$C_{30}$ olefins and mixtures thereof.

19. The process of claim 18 wherein the amount of hydrocarbon is at least about one volume of hydrocarbon per volume of said reaction mixture.

20. The process of claim 15 wherein said reaction includes a pyridine promoter.

21. The process of claim 20 wherein said promoter is pyridine.

22. The process of claim 16 wherein said reaction includes a pyridine promoter.

23. The process of claim 22 wherein said promoter is pyridine.

24. The process of claim 19 wherein said reaction includes a pyridine promoter.

25. The process of claim 24 wherein said promoter is pyridine.

26. The process of claim 25 wherein said alkanol is methanol.

27. The process of claim 26 wherein said reaction is carried out at pressures above about 1,000 p.s.i.g.

28. The process of claim 27 wherein said hydrocarbon is selected from $C_5$–$C_{10}$ alkanes and mixtures thereof.

29. An improved process for preparing carboxylic acid esters which comprises 1. reacting $C_3$–$C_{40}$ olefin, CO and alkanol using a cobalt containing catalyst,
2. mixing the resultant reaction mixture from (1) which contains ester product and alkanol with an amount of normally liquid hydrocarbon sufficient to extract said ester from said reaction mixture, whereby a hydrocarbon phase and an alkanol phase are produced,
3. separating said hydrocarbon phase from said alkanol phase,
4. recovering said ester product from said hydrocarbon phase using conventional means, and
5. utilizing said alkanol phase, which contains substantially all of the cobalt containing catalyst in an active form directly as the catalyst in step (1).

30. The process of claim 29 wherein step (1) also includes a pyridine promoter.

31. The process of claim 30 wherein said promoter is pyridine.

32. The process of claim 29 wherein said alkanol is primary, monohydroxy, $C_1$–$C_5$ alkanol.

33. The process of claim 32 wherein said alkanol is methanol.

34. The process of claim 29 wherein said hydrocarbon is aliphatic.

35. The process of claim 34 wherein said hydrocarbon is selected from $C_5$–$C_{20}$ alkanes, $C_6$–$C_{30}$ olefins and mixtures thereof.

36. The process of claim 29 wherein said amount of hydrocarbon is at least about one volume of hydrocarbon per volume of reaction mixture.

37. The process of claim 29 wherein the molar ratio of olefin:alkanol in step (1) is at least about 1:1.1.

38. The process of claim 37 wherein said molar ratio of olefin:alkanol is 1:1.1 to 1:3.

39. The process of claim 36 wherein said hydrocarbon is aliphatic and said alkanol is primary, monohydroxy, $C_1$-$C_5$ alkanol.

40. The process of claim 39 wherein said step (1) includes a pyridine promoter.

41. The process of claim 40 wherein said promoter is pyridine.

42. The process of claim 41 wherein said alkanol is methanol.

43. The process of claim 30 wherein said step (1) is carried out at pressures above about 1,000 p.s.i.g.

44. The process of claim 30 wherein said step (1) is carried out at pressures above about 1,700 p.s.i.g.

45. The process of claim 40 wherein said step (1) is carried out at pressures above about 1,700 p.s.i.g.

46. The process of claim 42 wherein said step (1) is carried out at pressures above about 1,700 p.s.i.g.

47. The process of claim 46 wherein the molar ratio of olefin:alkanol molar ratio is at least about 1:1.1.

48. The process of claim 47 wherein said hydrocarbon is selected from $C_5$-$C_{10}$ alkanes and mixtures thereof.

* * * * *